(12) United States Patent
Devore et al.

(10) Patent No.: US 10,711,624 B2
(45) Date of Patent: Jul. 14, 2020

(54) AIRFOIL WITH GEOMETRICALLY SEGMENTED COATING SECTION

(71) Applicant: United Technologies Corporation, Farmington, CT (US)

(72) Inventors: Matthew A. Devore, Rocky Hill, CT (US); Adam P. Generale, Dobbs Ferry, NY (US); Tracy A. Propheter-Hinckley, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 490 days.

(21) Appl. No.: 15/353,896

(22) Filed: Nov. 17, 2016

(65) Prior Publication Data

US 2018/0135439 A1 May 17, 2018

(51) Int. Cl.
*F01D 5/28* (2006.01)
*F01D 9/04* (2006.01)
(Continued)

(52) U.S. Cl.
CPC .............. *F01D 5/288* (2013.01); *F01D 5/14* (2013.01); *F01D 9/041* (2013.01); *F01D 25/08* (2013.01); *F02C 3/04* (2013.01); *F04D 29/324* (2013.01); *F04D 29/542* (2013.01); *F04D 29/5853* (2013.01); *F05D 2220/32* (2013.01); *F05D 2230/90* (2013.01); *F05D 2240/35* (2013.01); *F05D 2250/283* (2013.01); *F05D 2260/231* (2013.01); *F05D 2300/17* (2013.01); *F05D 2300/611* (2013.01)

(58) Field of Classification Search
CPC . F01D 5/288; F01D 5/14; F01D 9/041; F01D 25/08; F02C 3/04; F04D 29/324; F04D 29/542; F04D 29/5853; F05D 2220/32; F05D 2230/90; F05D 2240/35; F05D 2250/283; F05D 2260/231; F05D 2300/17; F05D 2300/611; F05D 2250/28; F05D 2250/90
USPC .................................................. 415/177, 200
See application file for complete search history.

(56) References Cited

U.S. PATENT DOCUMENTS 3,215,511 A 11/1965 Chisholm
4,137,008 A 1/1979 Grant et al.
(Continued)

FOREIGN PATENT DOCUMENTS

EP 0158307 10/1985
EP 0661415 7/1995
(Continued)

OTHER PUBLICATIONS

U.S. Appl. No. 13/429,474, filed Mar. 26, 2012.
(Continued)

*Primary Examiner* — Justin D Seabe
*Assistant Examiner* — Cameron A Corday
(74) *Attorney, Agent, or Firm* — Carlson, Gaskey & Olds, P.C.

(57) ABSTRACT

An airfoil includes an airfoil body that has a geometrically segmented coating section. The geometrically segmented coating section includes a wall having an outer side. The outer side has an array of cells, and there is a coating disposed in the array of cells.

13 Claims, 5 Drawing Sheets

(51) Int. Cl.
*F01D 25/08* (2006.01)
*F04D 29/32* (2006.01)
*F04D 29/54* (2006.01)
*F04D 29/58* (2006.01)
*F02C 3/04* (2006.01)
*F01D 5/14* (2006.01)

(56) References Cited

U.S. PATENT DOCUMENTS

| | | | |
|---|---|---|---|
| 4,247,259 A | | 1/1981 | Saboe et al. |
| 4,396,349 A | | 8/1983 | Hueber |
| 4,914,794 A | * | 4/1990 | Strangman ............ F01D 11/122 29/527.2 |
| 5,057,379 A | * | 10/1991 | Fayeulle .................. C23C 4/02 427/453 |
| 5,358,379 A | | 10/1994 | Pepperman et al. |
| 5,538,380 A | | 7/1996 | Norton et al. |
| 5,681,616 A | | 10/1997 | Gupta et al. |
| 5,705,231 A | | 1/1998 | Nissley et al. |
| 5,951,892 A | | 9/1999 | Wolfla et al. |
| 6,000,906 A | | 12/1999 | Draskovich |
| 6,102,656 A | | 8/2000 | Nissley et al. |
| 6,224,963 B1 | | 5/2001 | Strangman |
| 6,316,078 B1 | | 11/2001 | Smialek |
| 6,503,574 B1 | | 1/2003 | Skelly et al. |
| 6,514,046 B1 | | 2/2003 | Morrison et al. |
| 6,543,996 B2 | | 4/2003 | Koschier |
| 6,703,137 B2 | | 3/2004 | Subramanian |
| 6,709,230 B2 | | 3/2004 | Morrison et al. |
| 6,846,574 B2 | | 1/2005 | Subramanian |
| 7,104,756 B2 | | 9/2006 | Harding et al. |
| 7,316,539 B2 | | 1/2008 | Campbell |
| 7,326,030 B2 | | 2/2008 | Albrecht et al. |
| 7,435,058 B2 | | 10/2008 | Campbell et al. |
| 7,452,182 B2 | | 11/2008 | Vance et al. |
| 7,520,725 B1 | | 4/2009 | Liang |
| 7,670,116 B1 | | 3/2010 | Wilson, Jr. et al. |
| 7,963,745 B1 | | 6/2011 | Liang |
| 8,079,806 B2 | | 12/2011 | Tholen et al. |
| 8,182,208 B2 | | 5/2012 | Bridges, Jr. et al. |
| 8,197,211 B1 | | 6/2012 | Liang |
| 8,202,043 B2 | | 6/2012 | McCaffrey |
| 8,251,651 B2 | | 8/2012 | Propheter-Hinckley et al. |
| 8,366,392 B1 | | 2/2013 | Laing |
| 8,480,366 B2 | | 7/2013 | Malecki et al. |
| 8,506,243 B2 | | 8/2013 | Strock et al. |
| 8,821,124 B2 | | 9/2014 | Viens et al. |
| 2003/0138316 A1 | * | 7/2003 | Sathianathan ........ F01D 21/045 415/9 |
| 2007/0275210 A1 | * | 11/2007 | Heselhaus ............... F01D 5/288 428/116 |
| 2008/0159850 A1 | | 7/2008 | Tholen et al. |
| 2010/0136258 A1 | | 6/2010 | Strock et al. |
| 2011/0097538 A1 | * | 4/2011 | Bolcavage ............. F01D 5/288 428/137 |
| 2011/0116920 A1 | * | 5/2011 | Strock .................... C23C 28/00 415/229 |
| 2016/0090851 A1 | | 3/2016 | Carr et al. |

FOREIGN PATENT DOCUMENTS

| | | |
|---|---|---|
| EP | 0764764 | 3/1997 |
| EP | 1764481 | 3/2007 |
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |
| WO | 2016133579 | 8/2016 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202359.0 complete Mar. 8, 2018.

* cited by examiner

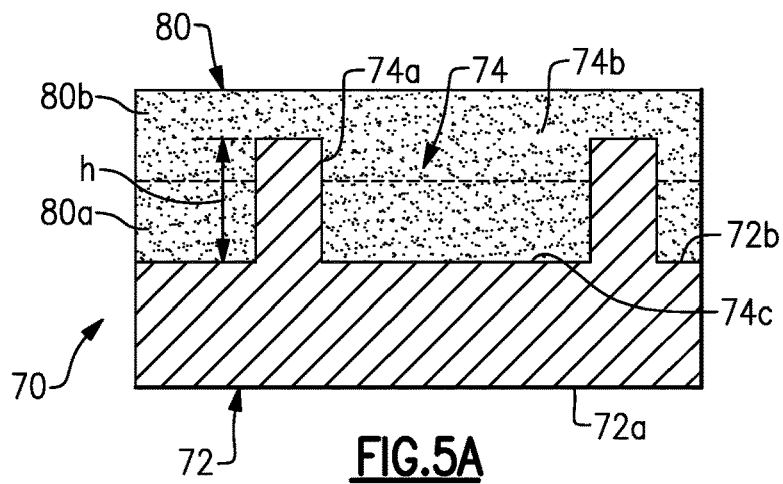
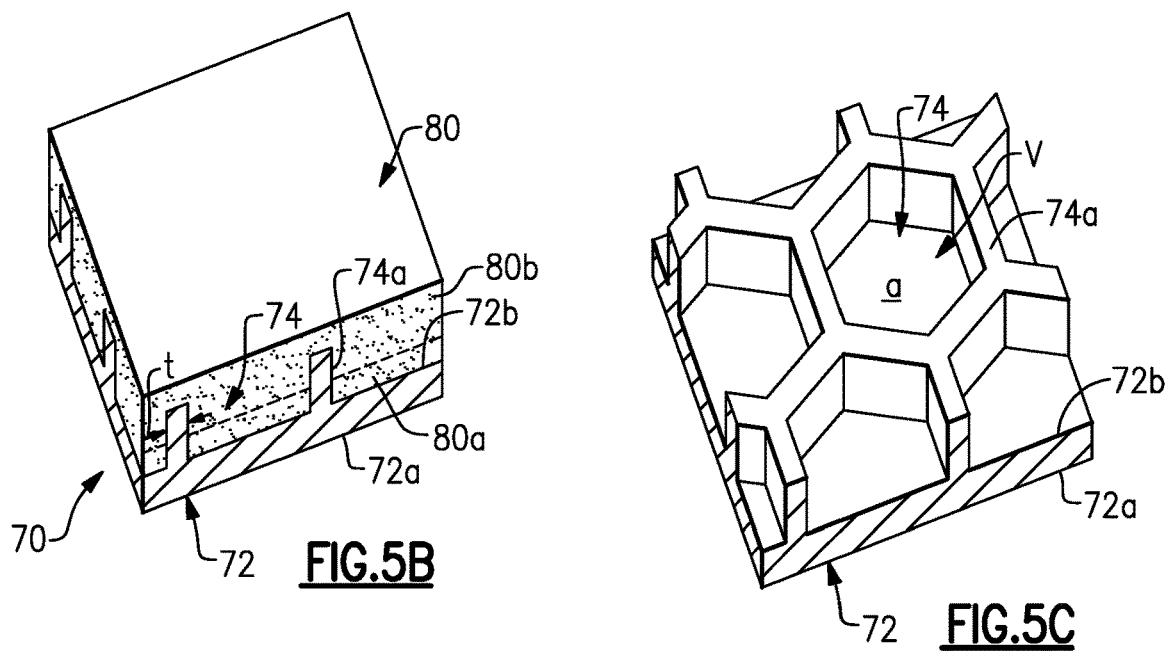
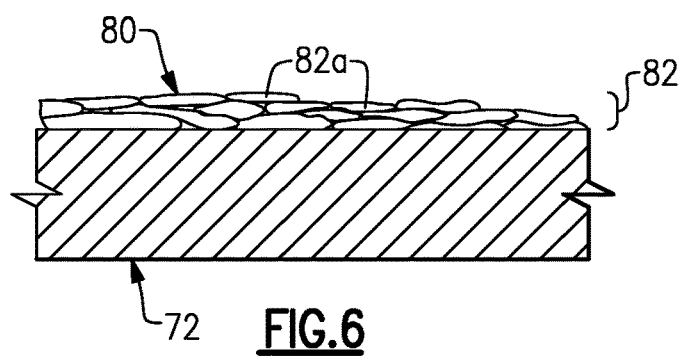

AIRFOIL WITH GEOMETRICALLY SEGMENTED COATING SECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil body that has a geometrically segmented coating section. The geometrically segmented coating section includes a wall that has an outer side. The outer side includes an array of cells that have cell volumes, and the cell volumes vary across the array. A coating is disposed in the array of cells.

In a further embodiment of any of the foregoing embodiments, the cell volumes serially decrease across the array.

In a further embodiment of any of the foregoing embodiments, the cell volumes gradually change across the array.

In a further embodiment of any of the foregoing embodiments, the cells have individual cell heights, and each of the cell heights is tapered.

In a further embodiment of any of the foregoing embodiments, the cell volumes step-change across the array.

In a further embodiment of any of the foregoing embodiments, the cells have individual cell heights, and each of the cell heights is non-tapered.

In a further embodiment of any of the foregoing embodiments, the cells have individual cross-sectional areas, and the cross-sectional areas vary across the array to vary the cell volumes.

In a further embodiment of any of the foregoing embodiments, the airfoil body includes an airfoil section that defines an airfoil profile The airfoil profile has a leading end, a trailing end, a pressure side, and a suction side, and the geometrically segmented coating section is on at least one of the pressure side or the suction side.

In a further embodiment of any of the foregoing embodiments, the wall is metal and the coating is ceramic.

In a further embodiment of any of the foregoing embodiments, the metal is an alloy and the ceramic includes yttria.

In a further embodiment of any of the foregoing embodiments, the cells are polygonal.

In a further embodiment of any of the foregoing embodiments, the coating has a laminar microstructure.

In a further embodiment of any of the foregoing embodiments, the cell volumes serially decrease across the array. The airfoil body includes an airfoil section that defines an airfoil profile. The airfoil profile has a leading end, a trailing end, a pressure side, and a suction side. The geometrically segmented coating section is on at least one of the pressure side or the suction side. The wall is metal, the coating is ceramic, the cells are polygonal, and the coating has a laminar microstructure.

A gas turbine engine according to an example of the present disclosure include a compressor section, a combustor in fluid communication with the compressor section, and a turbine section in fluid communication with the combustor. One of the turbine section or the compressor section includes an airfoil that has an airfoil body that includes a geometrically segmented coating section. The geometrically segmented coating section includes a wall that has an outer side. The outer side includes an array of cells that have cell volumes, and the cell volumes vary across the array. A coating is disposed in the array of cells.

In a further embodiment of any of the foregoing embodiments, the cell volumes serially decrease across the array.

In a further embodiment of any of the foregoing embodiments, the airfoil body includes an airfoil section that defines an airfoil profile. The airfoil profile has a leading end, a trailing end, a pressure side, and a suction side. The geometrically segmented coating section is on at least one of the pressure side or the suction side. The wall is metal, the coating is ceramic, the cells are polygonal, and the coating has a laminar microstructure.

An article according to an example of the present disclosure includes a body that has a geometrically segmented coating section. The geometrically segmented coating section includes a wall that has a side. The side includes an array of cells that have cell volumes, and the cell volumes vary across the array. A coating is disposed in the array of cells.

In a further embodiment of any of the foregoing embodiments, the body is an airfoil.

In a further embodiment of any of the foregoing embodiments, the cell volumes serially decrease across the array.

In a further embodiment of any of the foregoing embodiments, the airfoil includes an airfoil section that defines an airfoil profile. The airfoil profile has a leading end, a trailing end, a pressure side, and a suction side. The geometrically segmented coating section is on at least one of the pressure side or the suction side. The wall is metal, the coating is ceramic, the cells are polygonal, and the coating has a laminar microstructure.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5A illustrates a sectioned view of a segmented coating section.

FIG. 5B illustrates a perspective view of the segmented coating section of FIG. 5A.

FIG. 5C illustrates a wall of the segmented coating section, without the coating.

FIG. 6 illustrates a laminar microstructure of a coating.

DETAILED DESCRIPTION

Figure 1:
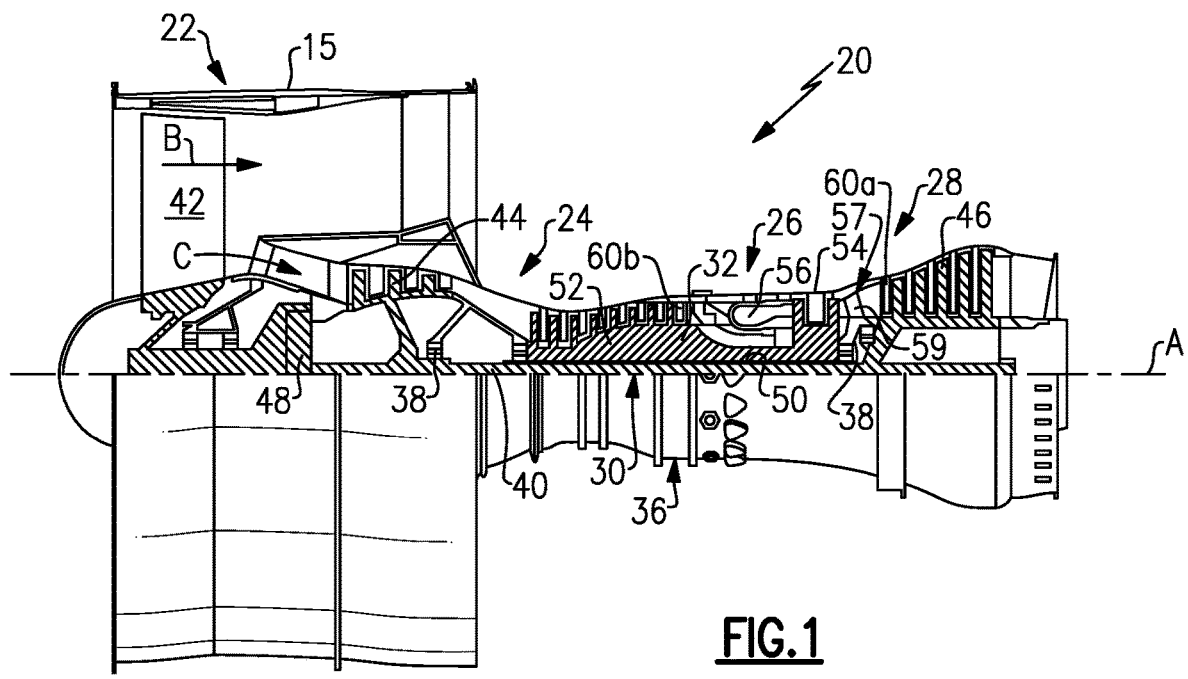
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figures 2A, 2B:
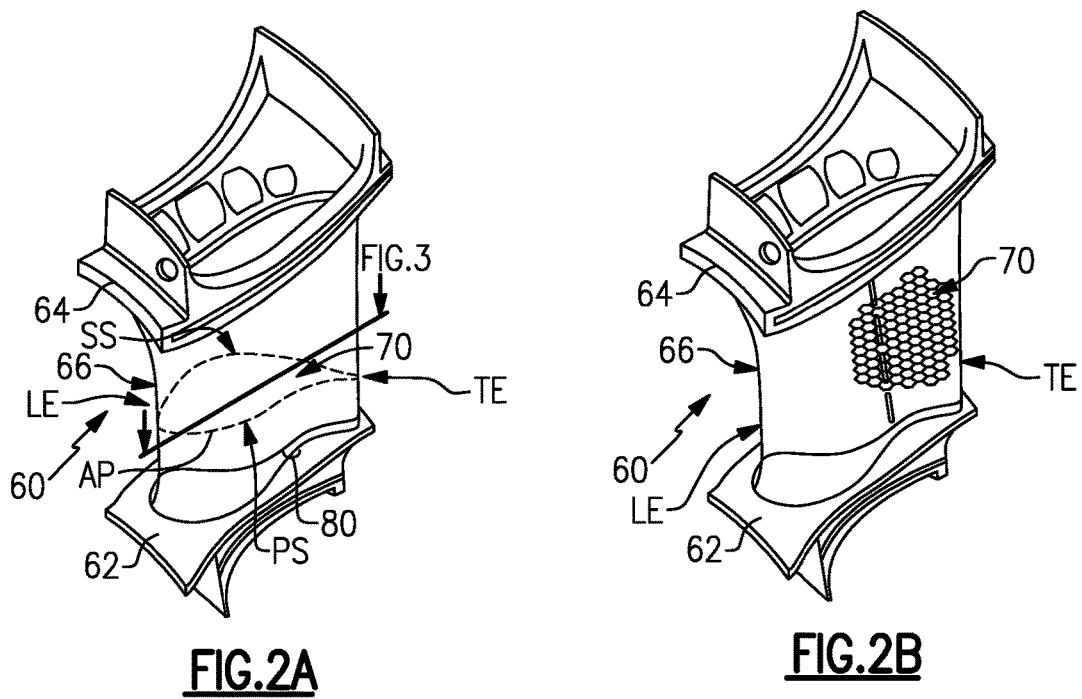
FIG. 2A illustrates an example airfoil in the gas turbine engine.
FIG. 2B the airfoil of FIG. 2A with a cutaway portion.

FIG. 2A illustrates one such component, namely an article 60. In the illustrated example, the article 60 is an airfoil. For instance, the article 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades, other airfoils, or other articles that are exposed to high temperatures.

Figure 3:
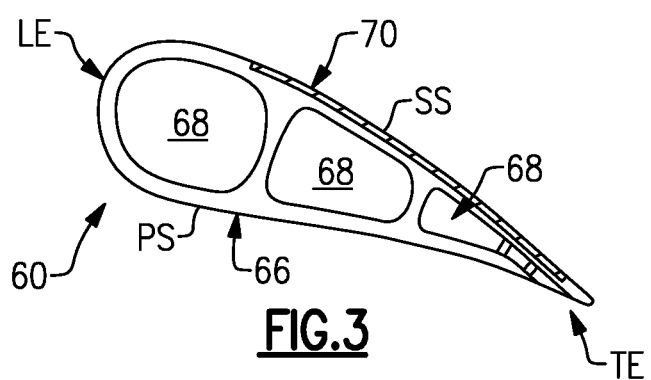
FIG. 3 illustrates a sectioned view of the airfoil of FIG. 2A.

The airfoil 60 includes a body which generally includes inner and outer platforms 62/64 and an airfoil section 66 that extends radially between the inner and outer platforms 62/64. The airfoil section 66 may be hollow and can include one or more internal passages 68 (FIG. 3). A passage can include a cavity, a channel, or the like.

The airfoil section 66 defines an airfoil profile (AP), which is the peripheral shape when viewed in a radial direction. For example, the airfoil profile (AP) has a wing-like shape that provides a reaction force via Bernoulli's principle. The airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP). The leading edge may be the portion of the airfoil profile (AP) that first contacts air or the foremost edge of the airfoil profile (AP). For a variable vane, the leading edge may shift, depending on the orientation of the vane.

Figure 4:
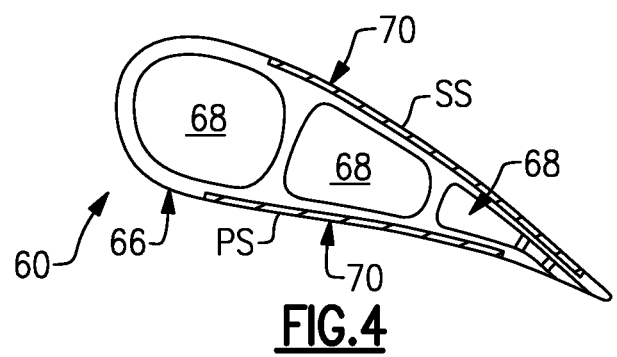
FIG. 4 illustrates a sectioned view of a modified example of the airfoil of FIG. 2A.

To enhance the temperature resistance capability of the article 60, the article 60 includes a geometrically segmented coating section 70, which is shown in partial cut away in FIG. 2B. The coating section 70 may be integral with the airfoil section 66, but could alternatively be a segment or panel in the airfoil section 66. As shown in FIG. 3, in this example, the coating section 70 is located on a suction side (SS) of the airfoil section 66. Alternatively or additionally, a coating section 70 could also be provided on the pressure side (PS) of the airfoil section 66, as depicted in a modified example in FIG. 4, on a leading end (LE) of the airfoil section 66, or on one or both of the platforms 62/64. As will be described in further detail below, the coating section 70 includes a segmented structure to enhance temperature resistance capability of the article 60.

FIG. 5A illustrates a sectioned view through a portion of the coating section 70, and FIG. 5B illustrates a sectioned perspective view of the coating section 70. The coating section 70 includes a wall 72. The wall 72 includes a first side 72a that will most typically border the passage 68 and a second side 72b that is opposite the first side 72a. The second side 72b includes an array of cells 74 defined by cell sidewalls 74a. The cells 74 have an open cell topside 74b and a cell bottomside 74c formed by a portion of the wall 72. In this example, the cell sidewalls 74a have a uniform thickness (t). Each cell 74 also has an individual cell height (h), which is the distance from the cell bottomside 74c to the cell topside 74b (which is substantially flush with the tops of the cell sidewalls 74a). And each cell 74 also has a cross-sectional area, represented at (a) in FIG. 5C. Assuming the cell sidewalls 74a are straight, the cross-sectional area (a) is the area of the cell bottomside 74c or cell topside 74b. If the cell sidewalls 74a are not straight, the cross-sectional area (a) is the area of the cell topside 74b. Each cell 74 also has an associated volume, represented at (V). The volume (V) is the space bounded by the cell sidewalls 74a, the cell topside 74b, and the cell bottomside 74c. In the illustrated example, all of the cell heights (h) are equal, all of the cell cross-sectional areas are equal, and all of the cell volumes (V) are equal. For geometric cells 74, the volumes can be determined or estimated by known geometric equations based on the cell dimensions. Alternatively, the volumes can be determined experimentally or by using computer analysis, such as with computer-aided design software.

The array is a repeating geometric pattern of one or more cell geometries. As shown in the isolated view of the wall 72 in FIG. 5C, the cells 74 are hexagonal. Alternatively, the cells 74 are circular, ovular, other polygonal geometry, or mixed cell geometries. The cells 74 may have been machined or cast directly into the wall 72 (as a substrate), or machined into a metallic bond coating applied to the second side 72b of the wall 72. In the case where the cells 74 are machined or cast directly into the wall 72 (as a substrate), a metallic bond coating may be applied.

A coating 80 is disposed in the array of cells 74. The cells 74 mechanically facilitate bonding of the coating 80 on the wall 72. The coating 80 is a barrier coating, such as a thermal barrier or environmental barrier, which is formed of a ceramic. A ceramic is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. The coating 80 may be a monolayer coating but more typically will be a multi-layer coating. For instance, the coating 80 has a first coating layer 80a and a second coating layer 80b. In this example, the second coating layer 80b is a topcoat and extends over the tops of the cell sidewalls 74a.

The ceramic of the coating 80 provides thermal and/or environmental resistance. As an example, the ceramic material may include or may be yttria stabilized with zirconia, hafnia, and/or gadolinia, gadolinia zirconate, molybdate, alumina, or combinations thereof.

The coating 80 may also include a bond coat for attaching the ceramic material to the wall 72 and cells 74. The wall 72 and cells 74 may be formed of an alloy. Example alloys may include, but are not limited to, nickel alloys, cobalt alloys, a nickel alloy coated with cobalt or cobalt alloy, or non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 74a also facilitate reducing internal stresses in the coating 80 that may occur from sintering at relatively high surface temperatures during use in the engine 20. The sintering may result in partial melting, densification, and diffusional shrinkage of the coating 80 and thereby induce internal stresses. The cell sidewalls 74a serve to produce faults in at least the portion of the coating 80. The faults provide locations for releasing energy associated with the internal stresses (e.g., reducing shear and radial stresses). That is, the energy associated with the internal stresses may be dissipated in the faults such that there is less energy available for causing delamination cracking between the coating 80 and the underlying wall 72.

The coating section 70 may be formed using several different fabrication techniques. As an example, the wall 72 may be fabricated by investment casting, additive manufacturing, brazing, or combinations thereof, but is not limited to such techniques. For instance, the cells 74 can be separately fabricated and brazed to the remaining portion of the wall 72, which can be investment cast or additively fabricated. Alternatively, the cells 74 can be formed by other techniques, such as depositing an alloy coating and removing sections of the alloy coating by machining, electro-discharge machining (EDM), or other removal process.

To produce the coating 80, ceramic coating material is deposited in the cells 74. The deposition process can include, but is not limited to, plasma spray or physical vapor deposition. In one example, plasma spray is used to produce a more durable version of the coating 80. For instance, as shown in FIG. 6, the coating 80 has a laminar microstructure 82. The laminar microstructure 82 includes grains 82a of ceramic material that have a high aspect ratio. The laminar microstructure 82 is a product of the plasma spray process, in which droplets of melted or partially melted ceramic material are sprayed onto the cells 74. Upon impact, the droplets flatten and solidify, yielding the laminar microstructure 82. There may be voids or pores among the grains 82a; however, the coating 80 is substantially fully dense. For instance, the coating 80 has a porosity of less than 15%.

The ceramic coating material fills or substantially fills the cells 74 and is deposited in a thickness that is greater than the height (h) of the cell sidewalls 74a. At this stage, the surface of the coating may have contours from the underlying cells 74. If such contours are undesired, the surface may be machined, ground, or abraded flat. For instance, the surface is reduced down to or close to the tops of the cell sidewalls 74a.

Figure 7A:
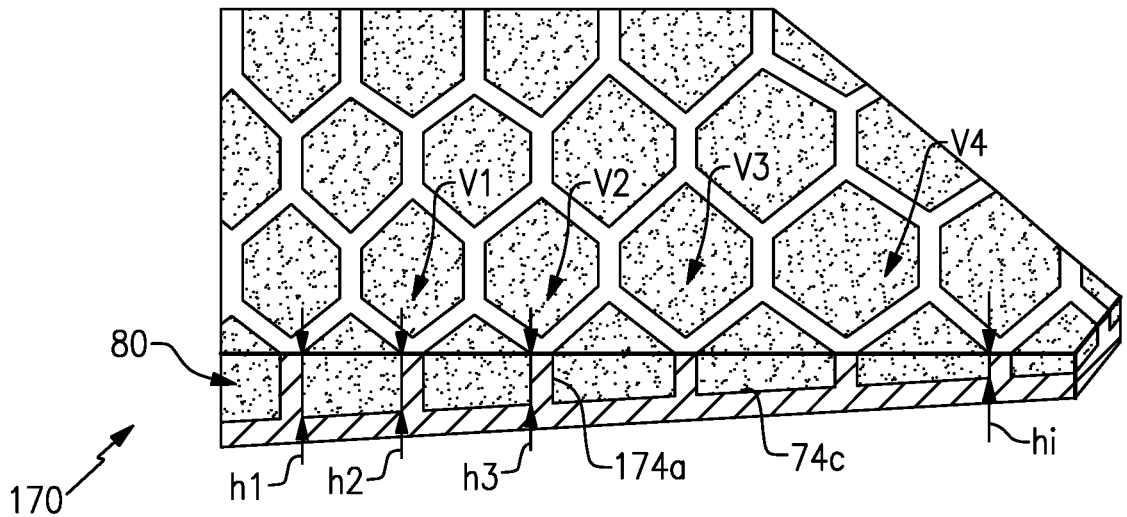
FIG. 7A illustrates an example segmented coating section with cell heights that taper.
Figure 7B:
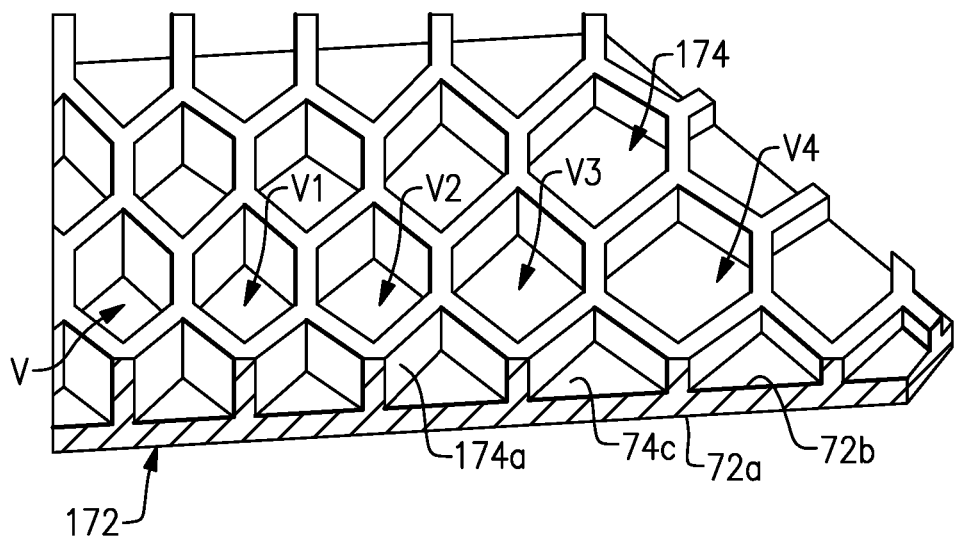
FIG. 7B illustrates a wall of the segmented coating section of FIG. 7A, without the coating.

FIG. 7A illustrates a representative section of another example geometrically segmented coating section 170, and FIG. 7B illustrates the wall 172 of the coating section 170 without the coating 80. In this disclosure, like reference numerals designate like elements where appropriate and reference numerals with the addition of one-hundred or multiples thereof designate modified elements that are understood to incorporate the same features and benefits of the corresponding elements. In this example, the cell volumes (V) of cells 174 vary across the array. For instance, the cell volumes V1/V2/V3/V4 of immediately adjacent cells 174 (serial cells) decrease in volume.

In the illustrated example, the cell volumes (V) gradually change across the array. For instance, the cell heights (h) are tapered such that the height of a single cell is non-uniform. As an example, the cell 174 has a cell height (h1) at one of the cell sidewalls 174a and a cell height (h2) at another of the cell sidewalls 174a. In this case, h1 is greater than h2. The other sidewalls 174a of the cell 174 may have intermediate heights between h1 and h2. Likewise, the next adjacent cell 174 starts with the cell height h2 as the greater height, and another of the cell sidewalls 174a has cell height h3, which is less than h2. In this manner, so on and so forth, the cells 174 gradually decrease (or alternatively increase) to cell height ($h_t$). In correspondence with the decreasing cell heights, the cell volumes decrease.

The variation in cell height (h) is used to tailor the thermal properties of the article 60. For instance, in regions of the article 60 that are exposed to higher temperature or more severe conditions, a greater cell height may be used to provide a correspondingly greater thickness of the coating 80. In regions of the article 60 that are exposed to lower temperature or less severe conditions, a smaller cell height may be used to provide a correspondingly smaller thickness of the coating 80.

Somewhat similarly, the cell heights may be tailored in accordance with the cooling bleed air provided in the passages 68. For instance, when the cooling bleed air first enters the passages 68 the air is relatively cool and thus has a higher cooling capacity. Thus, a smaller cell height may be provided in that region. After the air circulates in the passages 68, the air increases in temperature as it absorbs heat and thus has a lower cooling capacity. Thus, a greater cell height may be provided in that region. Additionally or alternatively, the cell heights can be tailored to provide a more uniform thermal gradient in the article 60, which may facilitate reduction in thermal stresses. In further examples, the cell heights may also be tailored for the physical location on the article 60. For instance, the airfoil section 66 narrows at the trailing end (TE). The cell heights may thus decrease toward the trailing end (TE).

Figure 8A:
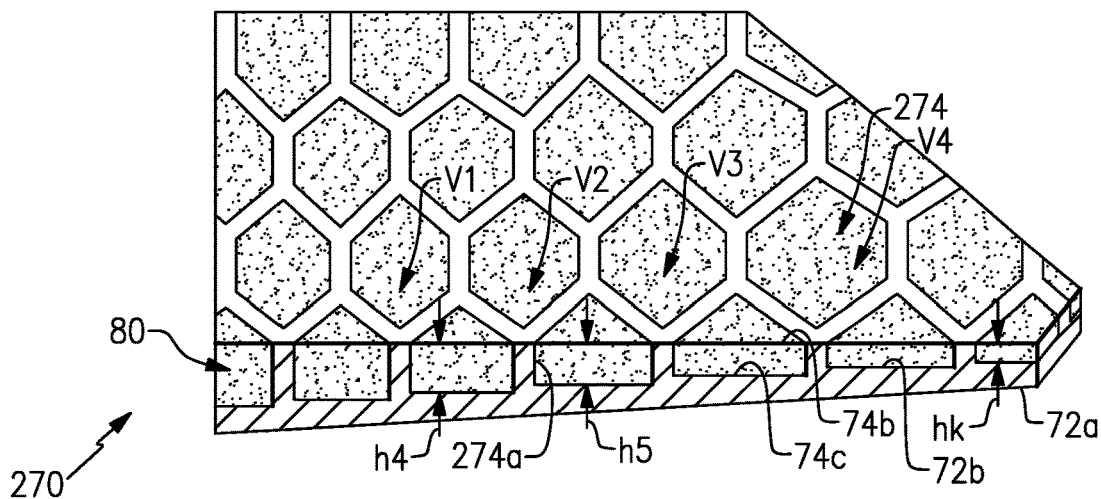
FIG. 8A illustrates an example segmented coating section with cell heights that are non-tapered.
Figure 8B:
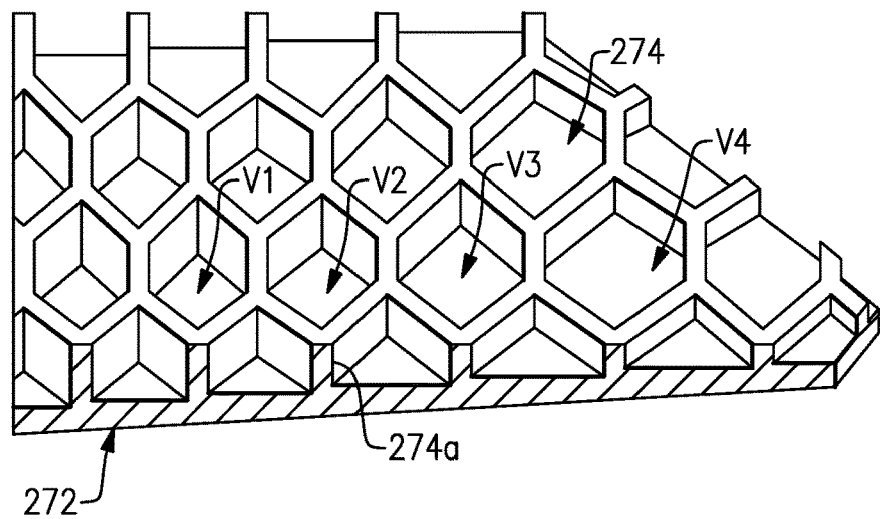
FIG. 8B illustrates a wall of the segmented coating section of FIG. 8A, without the coating.

FIG. 8A illustrates a representative section of another example geometrically segmented coating section 270, and FIG. 8B illustrates the wall 272 of the coating section 270 without the coating 80. In this example, the cell volumes (V) of cells 274 vary across the array. For instance, the cell volumes V1/V2/V3/V4 of immediately adjacent cells 274 (serial cells) decrease in volume.

In the illustrated example, the cell volumes (V) step-change across the array. For instance, unlike the cells 174, the cell heights (h) of the cells 274 are non-tapered such that the height of a single cell is uniform. Rather, the cell bottomsides 74c are shifted, or stepped, relative to the cell topsides 74b. As an example, the cell 274 has a cell height h4 that is uniform or constant across the cell sidewalls 274a. The next adjacent cell 274 has a cell height h5, which is less than h4. In this manner, so on and so forth, the cells 274 gradually decrease (or alternatively increase) to cell height ($h_t$). In correspondence with the decreasing cell heights, the cell volumes decrease.

Figure 9:
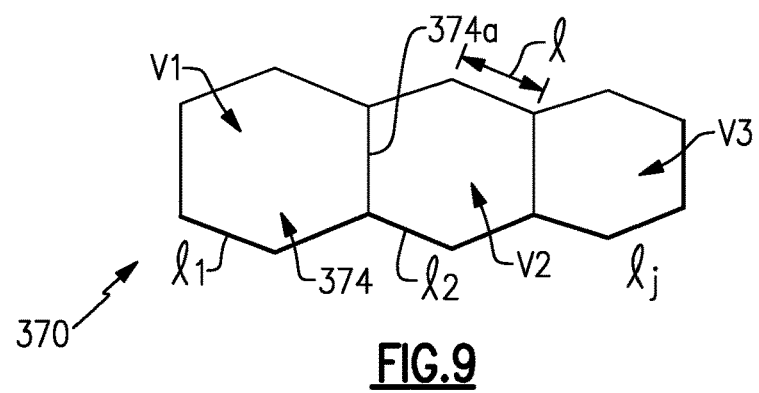
FIG. 9 illustrates an example segmented coating section with cell cross-sectional areas that vary in size.

FIG. 9 schematically illustrates a selected portion of another example geometrically segmented coating section 370, with cells 374. In this example, the cell volumes (V) of cells 374 vary across the array. For instance, the cell volumes V1/V2/V3 of immediately adjacent cells 374 (serial cells) decrease in volume. Unlike the cells 174/274 that vary in the cell height, the cells 374 vary in the lengths (l) of the cell sidewalls 374a. As an example, the cell 374 has a sidewall length (l1) and the next adjacent cell 374 has a sidewall length (l2) that is less than (l1). For comparison, the lengths are taken at the same relative positions on the cell 374. In this manner, so on and so forth, the cells 374 gradually decrease (or alternatively increase) to sidewall length ($l_j$). In correspondence with the decreasing sidewall lengths, the cell cross-sectional areas decrease and the cell volumes decrease. In further examples, the cells of a coating section may employ multiple cell types, such as cells have tapered heights with cells that vary in cross-sectional area, cells that have tapered heights with cells that have non-tapered heights, cells that have non-tapered height with cells that vary in cross-sectional area, and cells that have tapered height with cells that have non-tapered height and cells that vary in cross-sectional area.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
an article body having a geometrically segmented coating section, the geometrically segmented coating section including
a wall having an outer side, the outer side including a series of at least three polygonal cells that are consecutively conjoined by common cell walls, each said polygonal cell defining a cell volume, and
a coating disposed in the array of cells, wherein the series of at least three polygonal cells includes:
(a) each said polygonal cell defining a flat cell floor, a sloped cell top plane, and a cell height from the flat cell floor to the sloped cell top plane, the cell height continuously decreasing across each said polygonal cell, and the cell volumes decreasing across the series, or
(b) each said polygonal cell defining a flat cell floor, a cell top plane, and a cell height from the flat cell floor to the cell top plane, the cell height being constant across each said polygonal cell, and the cell volumes decreasing across the series.

2. The gas turbine engine article recited in claim 1, wherein the article body includes an airfoil section that defines an airfoil profile, the airfoil profile having a leading end, a trailing end, a pressure side, and a suction side, and the geometrically segmented coating section is on at least one of the pressure side or the suction side.

3. The gas turbine engine article as recited in claim 1, wherein the wall is metal and the coating is ceramic.

4. The gas turbine engine article as recited in claim 3, wherein the metal is an alloy and the ceramic includes yttria.

5. The gas turbine engine article as recited in claim 1, wherein the coating has a laminar microstructure.

6. The gas turbine engine article as recited in claim 1, wherein the coating includes hafnia.

7. The gas turbine engine article as recited in claim 6, wherein the coating is flat such that it excludes contours from the polygonal cells.

8. The gas turbine engine article as recited in claim 1, wherein the series of at least three polygonal cells includes (a).

9. The gas turbine engine article as recited in claim 1, wherein the series of at least three polygonal cells includes (b).

10. The gas turbine engine article as recited in claim 1, wherein each of the polygonal cells is an irregular polygon.

11. The gas turbine engine article as recited in claim 1, wherein each of the polygonal cells is defined by cell sidewalls, and the cell sidewalls are of uniform thickness from bottom to top and are of equivalent thickness around each of the polygonal cells.

12. A gas turbine engine comprising:
a compressor section;
a combustor in fluid communication with the compressor section; and
a turbine section in fluid communication with the combustor,
at least one of the turbine section or the compressor section including an airfoil having an airfoil body including a geometrically segmented coating section, the geometrically segmented coating section including
a wall having an outer side, the outer side including a series of at least three polygonal cells that are consecutively conjoined by common cell walls, each said polygonal cell defining a cell volume, and
a coating disposed in the array of cells, wherein the series of at least three polygonal cells includes:
(a) each said polygonal cell defining a flat cell floor, a sloped cell top plane, and a cell height from the flat cell floor to the sloped cell top plane, the cell height continuously decreasing across each said polygonal cell, and the cell volumes decreasing across the series, or
(b) each said polygonal cell defining a flat cell floor, a cell top plane, and a cell height from the flat cell floor to the cell top plane, the cell height being constant across each said polygonal cell, and the cell volumes decreasing across the series.

13. The gas turbine engine as recited in claim 12, wherein the airfoil body includes an airfoil section that defines an airfoil profile, the airfoil profile has a leading end, a trailing end, a pressure side, and a suction side, the geometrically segmented coating section is on at least one of the pressure side or the suction side, the wall is metal, the coating is ceramic, the cells are polygonal, and the coating has a laminar microstructure.

* * * * *